(12) United States Patent
Strauss (10) Patent No.: US 9,034,948 B2
(45) Date of Patent: May 19, 2015

(54) ADDITIVE PROCESS FOR PRODUCTION OF DIMENSIONALLY STABLE THREE DIMENSIONAL OBJECTS

(71) Applicant: EBS Concepts, LLC, Boulder, CO (US)

(72) Inventor: Eric B. Strauss, Longmont, CO (US)

(73) Assignee: Small Beginnings, LLC, Fort Collins, CO (US)

( * ) Notice: Subject to any disclaimer, the term of this patent is extended or adjusted under 35 U.S.C. 154(b) by 142 days.

(21) Appl. No.: 13/789,522

(22) Filed: Mar. 7, 2013

(65) Prior Publication Data

US 2013/0237636 A1 Sep. 12, 2013

Related U.S. Application Data

(60) Provisional application No. 61/608,212, filed on Mar. 8, 2012.

(51) Int. Cl.
| | |
|---|---|
| C08J 9/32 | (2006.01) |
| C09D 161/28 | (2006.01) |
| C08L 61/28 | (2006.01) |
| B29C 67/00 | (2006.01) |
| B29C 70/12 | (2006.01) |
| C08K 3/28 | (2006.01) |
| C08K 3/30 | (2006.01) |
| B29C 33/38 | (2006.01) |

(52) U.S. Cl.
CPC ............... *C09D 161/28* (2013.01); *C08L 61/28* (2013.01); *B29C 67/0055* (2013.01); *B29C 33/38* (2013.01); *B29C 70/12* (2013.01); *B29C 33/3842* (2013.01); *C08K 3/28* (2013.01); *C08K 3/30* (2013.01)

(58) Field of Classification Search
USPC .............. 523/218, 219; 524/6, 423, 428, 445, 524/494, 495
See application file for complete search history.

(56) References Cited

U.S. PATENT DOCUMENTS

| | | | |
|---|---|---|---|
| 2,571,343 A | 10/1951 | Dailey et al. | |
| 2,694,025 A | 11/1954 | Games et al. | |
| 2,770,840 A | 11/1956 | Biefeld et al. | |
| 2,842,121 A | 7/1958 | Billings et al. | |
| 3,666,600 A | 5/1972 | Stanley | |
| 4,062,917 A | 12/1977 | Hill et al. | |
| 4,216,047 A | 8/1980 | Hilliard et al. | |
| 4,353,855 A | 10/1982 | Garabedian | |
| 4,548,859 A | 10/1985 | Kline et al. | |
| 5,288,775 A * | 2/1994 | Bischoff et al. | 524/2 |
| 5,340,656 A | 8/1994 | Sachs et al. | |
| 5,387,380 A | 2/1995 | Cima et al. | |
| 5,902,441 A | 5/1999 | Bredt et al. | |
| 6,352,609 B1 | 3/2002 | Southmayd et al. | |
| 6,537,654 B1 | 3/2003 | Gruber et al. | |
| 6,736,689 B2 | 5/2004 | Renard et al. | |
| 7,037,382 B2 | 5/2006 | Davidson et al. | |
| 7,300,893 B2 | 11/2007 | Barsoum et al. | |
| 7,478,579 B2 | 1/2009 | Carberry et al. | |
| 7,537,054 B2 | 5/2009 | Reddy et al. | |
| 7,767,014 B2 | 8/2010 | Strauss | |
| 7,980,165 B2 | 7/2011 | Misencik et al. | |
| 2008/0057318 A1 | 3/2008 | Adzima et al. | |
| 2008/0271595 A1 | 11/2008 | Bird et al. | |

OTHER PUBLICATIONS

U.S. Appl. No. 61/608,212, filed Mar. 8, 2012.
U.S. Appl. No. 60/852,031, filed Oct. 16, 2006.
PCT International Patent Application No. PCT/US2007/021994, filed Oct. 16, 2007.
U.S. Appl. No. 61/461,586, filed Jan. 19, 2011.
U.S. Appl. No. 13/353,185, filed Jan. 18, 2012.
AXSON Material Safety Data Sheet, AXSON North America, Inc., doc. No. AXF15.004 Rev. A, Feb. 21, 2003, pp. 1/4-4/4.
Saint-Gobain Vetrotex Material Safety Data Sheet, Saint-Gobain Vetrotex International S.A., Revision 1, Nov. 2001, pp. 2.13-13.13.
Dallas Material Safety Data Sheet, fax date of Sep. 10, 2001, five total pages.
Material Safety Data Sheet, BTL Specialty Resins Corp., MSDS No. BTL/BTLM415, Mar. 15, 1993, two total pages.
E.P.S., Inc. Material Safety Data Sheet, 85-2222812, Sep. 14, 2001, pp. 1-3.
Material Safety Data Sheet, Infosafe No, LPWZW, Nov. 22, 2007, pp. 1-5.
E.P.S., Inc. Material Safety Data Sheet, 85-1112812, Jul. 11, 1994, pp. 1-3.

* cited by examiner

*Primary Examiner* — Edward Cain
(74) *Attorney, Agent, or Firm* — Craig R. Miles; CR Miles P.C.

(57) ABSTRACT

Generally, compositions and methods of producing dimensionally stable three dimensional objects using an additive build up process. Specifically, materials combinable in an additive build up process using a materials printer for the production of stable three dimensional molds useful in the production of molded or formed parts.

20 Claims, 5 Drawing Sheets

ADDITIVE PROCESS FOR PRODUCTION OF DIMENSIONALLY STABLE THREE DIMENSIONAL OBJECTS

This United States Non-Provisional Patent Application claims the benefit of U.S. Provisional Patent Application No. 61/608,212, filed Mar. 8, 2012, hereby incorporated by reference herein.

I. FIELD OF THE INVENTION

Generally, compositions and methods of producing dimensionally stable three dimensional objects using an additive build up process. Specifically, materials combinable in an additive build up process using a materials printer for the production of stable three dimensional molds useful in the production of molded or formed parts.

II. BACKGROUND OF THE INVENTION

Generally, conventional materials printers build three-dimensional prototypes of an object by transferring a conventional powdered build material to a build surface in incremental layers. A conventional binder liquid can be selectively deposited on each layer to produce regions of bound powder.

However, conventional three-dimensional prototypes of an object produced using conventional powdered build materials and conventional binder liquids may result in as printed green objects which may be too porous or too dimensionally instable as to certain temperatures and pressures (whether expressed as an excess expansion or contraction or as a rapid deterioration) to utilize in certain applications which require a non-porous surface or an object having dimensions which are stable within a range of temperatures, such as ambient to about 600° F., or which are stable within a range a range of pressures, such as ambient to about 500 pounds per square inch, or changes in temperature or pressure within these ranges, such as the change in temperature and pressure achieved within an autoclave or similar adjustable temperature or pressure containment device. There would be a substantial advantage in using a build material and binder liquid that would result in a substantially non-porous object which does not have to be infiltrated with one or a combination of resins allowing direct utilization without any post-processing treatment.

Additionally, there would be a substantial advantage in providing a build material which could be used with conventional liquid binders to produce as printed green objects in which post-processing treatment is limited to providing a seal to the surface of the as printed green object and avoiding any treatment or infiltration with one or a combination of resins.

Additionally, there would be a substantial advantage in providing a post-processing treatment for as printed green objects created using conventional powdered build materials and conventional binder liquids to provide an object dimensionally stable to a wide range of temperatures such as ambient to 600° F., or at pressures of between ambient to about 500 pounds per square inch, or changes to temperature and pressure within these ranges, such as the change in temperature and pressure achieved within an autoclave or similar adjustable temperature or pressure containment device.

III. SUMMARY OF THE INVENTION

Accordingly, a broad object of the invention can be to provide compositions and methods of using such compositions to create three dimensional objects from a digital model file using a materials printer which as printed are dimensionally stable to changes in temperature and pressure. Specifically, compositions and methods of using such compositions with conventional three dimensional printers to create three dimensional objects which as printed are sufficiently dimensionally stable to use as molds for the production of molded products.

Another broad object of the invention can be to provide compositions and methods of using such compositions with conventional three dimensional printers to create as printed three dimensional molds which are sufficiently dimensionally stable to use in the production of molded products without substantial post-processing treatment of the as printed green mold generated by the conventional three dimensional printer.

Another broad object of the invention can be to provide compositions for build materials and binder liquids and methods of using such build materials and binder liquids with conventional three dimensional printers to create three dimensional molds sufficiently dimensionally stable to use in the production of molded products without substantial modification to the mold as printed by the three dimensional printer.

Another broad object of the invention can be to provide compositions for build materials and methods of using such build materials with conventional binder liquids in three dimensional printers to create three dimensional molds sufficiently dimensionally stable to use in the production of molded products by sealing the molding surface on which molded parts are laid up, formed or otherwise molded.

Another broad object of the invention can be to provide a method of modifying a three dimensional object as printed by a three dimensional printer using conventional build materials with conventional binder liquids to create a three dimensional object substantially dimensionally stable with respect to temperature, pressure, or changes and combinations thereof.

Another broad object of the invention can be to provide a method of treating a mold as printed by a three dimensional printers using conventional build materials and conventional binder liquids to create a mold sufficiently dimensionally stable with respect to temperature, pressure, or changes in temperature and pressure or combinations thereof, for use in the production of molded parts.

V. DETAILED DESCRIPTION OF THE INVENTION

Figure 1:
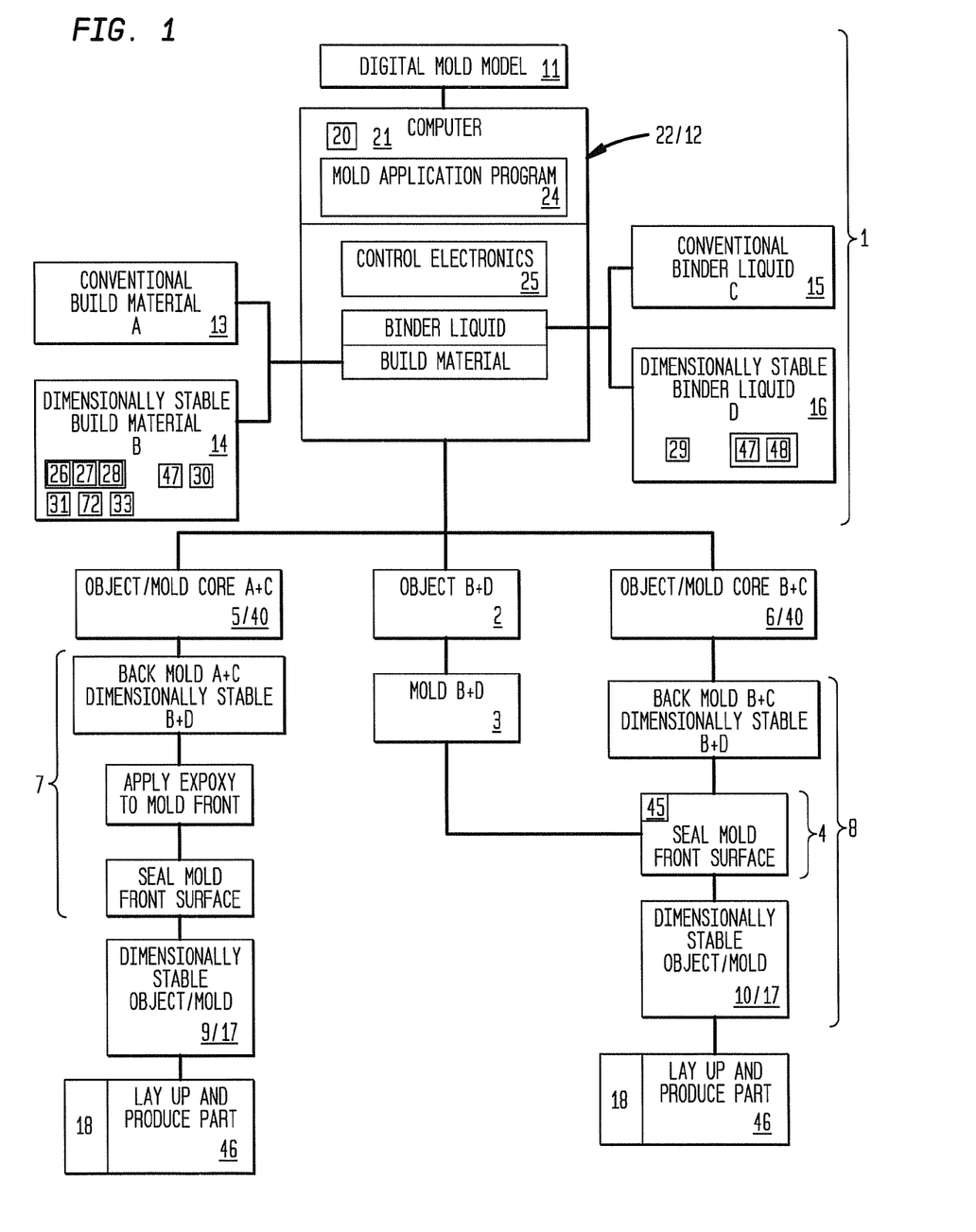
FIG. 1 is a schematic block flow diagram which illustrates particular methods of producing dimensionally stable objects using an additive build up process.

Now referring primarily to FIG. 1, a schematic diagram shows an additive build up process (1) for the production of dimensionally stable objects (2) which can be utilized without any post-process treatment, and for the production of dimensionally stable molds (3) which can be utilized with limited post-process treatment (4), and for the production of different types of core objects (5)(6) which can be stepwise treated (7)(8) to achieve corresponding dimensionally stable objects (9)(10) such as molds (17).

The term "additive build up process" for the purposes of this invention means any process of layering materials to produce a three dimensional object (2)(3)(5)(6), whether a dimensionally stable object (2), a dimensionally stable mold (3) which can be utilized with limited post-process treatment (4), or a type of core object (5)(6) suitable for post-production treatment(7)(8), and without limiting the breadth of the forgoing, particular embodiments of the additive build up process (1) include the conventional process referred to as three dimensional printing ("3D printing") in which a core object (5) is created from a digital model (11) using a materials printer (12) laying down successive layers of a build material (13) with a binder liquid (15) as described for example by U.S. Pat. No. 7,037,382, material (14) stereolithography, or using the inventive build material (14) and the inventive binder liquid (16), as described below.

The term "object" for the purposes of this invention means any configuration of three dimensional object and without limiting the breadth of the forgoing dimensionally stable molds (3) or objects (5)(6) which can be stepwise treated to provide dimensionally stable objects (9)(10) or dimensionally stable molds (17) on or in which mold materials (18) can be disposed or laid up for the production of molded parts (19).

The term "dimensionally stable" for the purposes of this invention means having fixed or substantially non-deforming dimensional relations at temperatures or pressures, or combinations of temperatures or pressures, or temperature or pressure gradients which include temperatures between ambient temperature and about 650 F.° and pressures between ambient and about 500 pounds per square inch or combinations thereof and in particular including those temperatures and pressures, temperature or pressure gradients, or applied temperatures or pressures normally utilized in forming or molding of molded parts (19) on or in a mold (3)(17).

Again referring primarily to FIG. 1, generally particular embodiments of the invention can include a digital model (11), a computer (21), a three dimensional materials deposition apparatus (22) or materials printer (12), and a three dimensional object (2)(3)(5)(6). The digital model (11) provides a data representation of the three dimensional object (2)(3)(5)(6) to be rendered in tangible form by operation of the three dimensional materials deposition apparatus (22) or materials printer (12).

The digital model (11) can for example be obtained using Computer Aided Design (CAD) software applications or three dimensional scanning systems, both of which are available from numerous different suppliers. The digital models (11) can be stored in industry-standard file formats as digital model files (20), which can be transmitted electronically and interpreted by a three dimensional materials deposition application program (24)(also referred to as the "application program") to provide computer program instructions which can be loaded onto a computer (21) to implement functions necessary to control the a three dimensional materials deposition apparatus (22) or materials printer (12) and additive build up process (1) to produce the object (2)(3)(5)(6) represented by the digital model (11). The computer (21) can take the form of a general purpose computer, special purpose computer or other programmable data processing apparatus.

As to particular embodiments of the invention, the computer (21) can run the application program (24) which reads the digital model files (20), accepts parameter and preference input from the user, performs a series of detailed calculations and transmits to the three dimensional materials deposition apparatus (22) or materials printer (12)(which as to particular embodiments can be a three dimensional printer such as a ZPRINTER® 350 available from Z Corporation or a three dimensional printer assembly as described in U.S. Pat. No. 7,037,382 which is incorporated by reference herein, or similar apparatus) commands and provides information needed to fabricate the desired three dimensional object (2)(3)(5)(6). In particular, the application program (24) may allow the user to arrange one or more digital models (11) in a virtual volume representing the actual fabrication space within the three dimensional materials deposition apparatus (22) or materials printer (12). The application program (24) can then slice the array of digital models (11) into a plurality of layers, each of a predetermined thickness, which are transmitted to control electronics (25) housed within three dimensional materials deposition apparatus (22) or materials printer (12).

Particular embodiments of the three dimensional materials deposition apparatus (22) or materials printer (12) can comprise a three dimensional printer having an array of jet type print heads which deposit conventional binder liquid (15) onto successive layers of a conventional build material (13), for example, as disclosed in U.S. Pat. No. 5,902,441, which is incorporated by reference herein. Where the conventional binder liquid (15) combines with the conventional build material (13), the powder reacts and hardens. By controlling the placement of binder droplets from these print heads, the solid structure of the three dimensional object (5) can be physically reproduced by an additive build up process (1). Further details of binding a conventional build material (13) with a conventional binder liquid (15) to form an object (5) are disclosed in U.S. Pat. No. 5,340,656 to Sachs et al. and U.S. Pat. No. 5,387,380 to Cima et al., which are incorporated by reference herein.

As to certain embodiments, the three dimensional materials deposition apparatus (22) or materials printer (12) can utilize an one or more of the inventive powdered build material(s) (14) and a conventional binder liquid (15), one or more of the inventive powdered build material(s) (14) and one or more of the inventive liquid binder (s) (16) which allows the additive build up process (1) for production of dimensionally stable objects (3), or a conventional build material (13) and one or more of the inventive liquid binder(s) (16), or combinations thereof.

Exemplary embodiments of the inventive build materials (14) and inventive liquid binders (16) useful in the additive build up process (1) for the production of dimensionally stable objects (2)(3) include:

TABLE 1

FORMULA 1

| RAW MATERIALS | PERCENT BY WEIGHT |
|---|---|
| Build Material (14): | |
| Alpha Gypsum (26) | to about 95% |
| Melamine Formaldehyde Resin (27) | about 5% to about 15% |
| Ammonium Chloride (28) | about 0.1% to about 1% |

As to each embodiment in Tables 1-15 the raw materials admixed to produce the build material (14) can be adjusted by weight percent within the ranges indicated to total 100%.
Binder Liquid (16):

| | |
|---|---|
| Acrylic Copolymer (29) | about 50% to about 100% (v/v) |
| Water | to about 50% |

As to each embodiment in Tables 1-15 a sufficient amount of the binder liquid deposited onto successive layers of the build material (14) to bind build material (14) in layers and as to particular embodiments the amount of binder liquid (16) in the built up three dimensional object (2)(3)(5)(6) being about 20% to about 45% by weight.

TABLE 2

FORMULA 2

| RAW MATERIALS | PERCENT BY WEIGHT |
|---|---|
| Build Material (14): | |
| Alpha Gypsum (26) | about 90% |
| Melamine Formaldehyde Resin (27) | about 8-10% |
| Ammonium Chloride (28) | about 0.1% to about 1% |
| Binder Liquid (16): | |
| Acrylic Copolymer (29) | about 50% to about 100% (v/v) |
| Water | to about 50% |

TABLE 3

FORMULA 3

| RAW MATERIALS | PERCENT BY WEIGHT |
|---|---|
| Build Material (14): | |
| FGR 95 (26) | to about 95% |
| BTLM-415 (27) | about 5% to about 15% |
| Ammonium Chloride (28) | about 0.1% to about 1% |
| Binder Liquid (16): | |
| VF-812 (29) | about 50% to about 100% (v/v) |
| Water | to about 50% |

TABLE 4

FORMULA 4

| RAW MATERIALS | PERCENT BY WEIGHT |
|---|---|
| Build Material (14): | |
| Alpha Gypsum (26) | about 60% to about 75% |
| Melamine Formaldehyde Resin (27) | about 5% to about 15% |
| Ammonium Chloride (28) | about 0.1% to about 1% |
| Reinforcement Elements (30) | about 0.5% to about 10% |
| Binder Liquid (16): | |
| Acrylic Copolymer (29) | about 50% to about 100% (v/v) |
| Water | to about 50% |

TABLE 5

FORMULA 5

| RAW MATERIALS | PERCENT BY WEIGHT |
|---|---|
| Build Material (14): | |
| FGR 95 (26) | about 60% to about 75% |
| BTLM-415 (27) | about 5% to about 15% |
| Cem-Fil Anti-Crak HP (30) | about 0.5% to about 10% |
| Ammonium Chloride (28) | about 0.1% to about 1% |
| Binder Liquid (16): | |
| VF-812 (29) | about 50% to about 100% (v/v) |
| Water | to about 50% |

TABLE 6

FORMULA 6

| RAW MATERIALS | PERCENT BY WEIGHT |
|---|---|
| Build Material (14): | |
| Alpha Gypsum (26) | about 60% to about 75% |
| Melamine Formaldehyde Resin (27) | about 5% to about 7% |
| Ammonium Chloride (28) | about 0.1% to about 1% |
| Reinforcement Elements (30) | about 0.5% to about 15% |
| Aluminum Powder (31) | about 0.5% to about 20% |
| Binder Liquid (16): | |
| Acrylic Copolymer (29) | about 50% to about 100% (v/v) |
| Water | to about 50% |

TABLE 7

FORMULA 7

| RAW MATERIALS | PERCENT BY WEIGHT |
|---|---|
| Build Material: | |
| FGR 95 (26) | about 60% to about 75% |
| BTLM-415 (27) | about 5% to about 15% |
| Ammonium Chloride (28) | about 0.1% to about 1% |
| Cem-Fil Anti-Crak HP (30) | about 0.5% to about 10% |
| Aluminum Powder (31) | about 0.5% to about 5% |
| Binder Liquid (16): | |
| VF-812 | about 50% to about 100% (v/v) |
| Water | to about 50% |

TABLE 8

FORMULA 8

| RAW MATERIALS | PERCENT BY WEIGHT |
|---|---|
| Build Material (14): | |
| Alpha Gypsum (26) | about 60% to about 75% |
| Melamine Formaldehyde Resin (27) | about 5% to about 15% |
| Ammonium Chloride (28) | about 0.1% to about 1% |
| Carbon Black (33) | about 0.1% to about 10% |
| Binder Liquid (16): | |
| Acrylic Copolymer (29) | about 50% to about 100% (v/v) |
| Water | to about 50% |

TABLE 9

FORMULA 9

| RAW MATERIALS | PERCENT BY WEIGHT |
|---|---|
| Build Material (14): | |
| FGR 95 (26) | about 60% to about 75% |
| BTLM-415 (27) | about 5% to about 1% |
| Ammonium Chloride (28) | about 0.1% to about 1% |
| Carbon Black (33) | about 0.1% to about 10% |
| Binder Liquid (16): | |
| VF-812 (29) | |
| Acrylic Copolymer | about 50% to about 100% (v/v) |
| Water | to about 50% |

TABLE 10

FORMULA 10

| RAW MATERIALS | PERCENT BY WEIGHT |
|---|---|
| Build Material (14): | |
| Alpha Gypsum (26) | about 60% to about 75% |
| Melamine Formaldehyde Resin (27) | about 5% to about 15% |
| Ammonium Chloride (28) | about 0.1% to about 1% |
| Carbon Black (33) | about 0.1% to about 10% |
| Chop Carbon Fiber (32) | about 0.5% to about 10% |
| Binder Liquid (16): | |
| Acrylic Copolymer (29) | about 50% to about 100% (v/v) |
| Water | to about 50% |

TABLE 11

FORMULA 11

| RAW MATERIALS | PERCENT BY WEIGHT |
|---|---|
| Build Material (14): | |
| FGR 95 (26) | about 60% to about 75% |
| BTLM-415 (27) | about 5% to about 15% |
| Ammonium Chloride (28) | about 0.1% to about 1% |
| Carbon Black (33) | about 0.1% to about 10% |
| Chop Carbon Fiber (32) | about 0.5% to about 10% |
| Binder Liquid (16): | |
| VF-812 (29) | about 50% to about 100% (v/v) |
| Water | to about 50% |

TABLE 12

FORMULA 12

| RAW MATERIALS | PERCENT BY WEIGHT |
|---|---|
| Build Material (14): | |
| Alpha Gypsum (26) | about 60% to about 75% |
| Melamine Formaldehyde Resin (27) | about 5% to about 7% |
| Ammonium Chloride (28) | about 0.1% to about 1% |
| Aluminum Powder (31) | about 0.5% to about 20% |
| Chop Carbon Fiber (32) | about 0.5% to about 15% |
| Binder Liquid (16): | |
| Acrylic Copolymer (29) | about 50% to about 100% (v/v) |
| Water | to about 50% |

TABLE 13

FORMULA 13

| RAW MATERIALS | PERCENT BY WEIGHT |
|---|---|
| Build Material (14): | |
| FGR 95 (26) | about 60% to about 75% |
| BTLM-415 (27) | about 5% to about 7% |
| Ammonium Chloride (28) | about 0.1% to about 1% |
| Aluminum Powder (31) | about 0.5% to about 20% |
| Chop Carbon Fiber (32) | about 0.5% to about 15% |
| Binder Liquid (16): | |
| VF-812 (29) | |
| Acrylic Copolymer | about 50% to about 100% (v/v) |
| Water | to about 50% |

TABLE 14

FORMULA 14

| RAW MATERIALS | PERCENT BY WEIGHT |
|---|---|
| Build Material (14): | |
| Alpha Gypsum (26) | about 50% to about 75% |
| Melamine Formaldehyde Resin (27) | about 5% to about 15% |
| Polyacrylic Acid (47) | about 2% to about 20% |
| Ammonium Chloride (28) | about 0.1% to about 1% |
| Binder Liquid (16): | |
| Water (48) | about 80% to about 95% |
| Isopropyl Alcohol (49) | about 5% to about 20% |

TABLE 15

FORMULA 15

| RAW MATERIALS | PERCENT BY WEIGHT |
|---|---|
| Build Material (14): | |
| Alpha Gypsum (26) | about 50% to about 75% |
| Melamine Formaldehyde Resin (27) | about 5% to about 15% |
| Polyacrylic Acid (47) | about 2% to about 20% |
| Ammonium Chloride (28) | about 0.1% to about 1% |
| Binder Liquid (16): | |
| Water (48) | about 20% to about 95% |
| Isopropyl Alcohol (49) | about 5% to about 20% |
| Acrylic Copolymer (29) | about 30% to about 70% |

The above exemplary formula along with the description are sufficient for the person of ordinary skill in the art to make and use numerous and varied embodiments of build materials (14) and liquid binders (16) in an additive build up process (1) using a wide variety of three dimensional materials deposition apparatuses (22) or material printers (12) for the production of dimensionally stable objects (2) and core objects (5) (6) which can if desired be made sufficiently dimensionally stable for a wide range of applications by one or more of the steps in a post-process treatment (7)(8).

Each of the inventive build materials (14) set forth in Tables 1-13 (shown in the example of FIG. 1 as build material B) can include an amount of alpha gypsum (26). The term "alpha gypsum" (or an equivalent or substantial equivalent materials) refers to a specially processed gypsum which is calcined under pressure to produce a gypsum material having high compressive strength. Typically, alpha gypsum has a purity CaSO4 of between about 95% and 99% by weight. A commercially available alpha gypsum product suitable for use with the invention is FGR 95 (US Gypsum, 125 South Franklin, Chicago, Ill.). As shown in Table 3, one embodiment of the inventive build materials (14) specifically includes FGR 95 to about 95% by weight which does not contain any reinforcement elements, such as, fibers, glass fiber, carbon fiber, or the like. This particular brand of alpha gypsum (26) is not intended to be limiting with respect to scope of alpha gypsum products or sources which can be utilized embodiments of the buildup material (14), rather reference to FGR 95 is intended to provide information from which a person of ordinary skill in the art can make and use the numerous and varied inventive build materials (14) explicitly and inherently described.

As shown in Tables 1-13, alpha gypsum (26) can be included in embodiment(s) of the build material (14) in the range of about 50% to about 95% by weight (as shown in the example of Table 1), or in the range of about 60% to about 75% (as shown in the example of Table 4), or in narrower ranges or the specific percentages by weight set out in the additional formulations. Greater or lesser weight percent alpha gypsum (26) can utilized within the ranges indicated depending on the particular application, or the amount of other materials admixed with the alpha gypsum (26).

As shown in Tables 1-13, the amount of alpha gypsum (26) by weight percent can be further admixed with an amount of melamine formaldehyde resin (27) (about 5% to about 15% wt./wt. depending on the application). The term "melamine formaldehyde resin" refers to an amino resin produced from melamine and formaldehyde which can be a powder if it has high molecular weight. A suitable molecular weight melamine formaldehyde resin (27) can be a powdered BTLM-415 available from BTLSR Toledo Inc., Toledo, Ohio. Again, while the build material (14) of Table 3 specifically includes BTLM-415 this exemplary embodiment is meant to be illustrative of the numerous and varied melamine formaldehyde resins (27) available having similar molecular weight characteristics, but rather is intended to provide an example of a melamine formaldehyde resin (27) from which the numerous and wide variety of build materials (14) whether explicitly or inherently described can be made and used.

Again as shown in Tables 1-13, to the mixture of alpha gypsum (26), melamine formaldehyde resin (27), and an amount of ammonium chloride (28) (CAS No.: 12125-02-9 available for example from Mallinckrodt Baker, Inc., 222 Red School Lane, Phillipsburg, N.J. 08865) can be admixed to obtain a homogeneous mixture of the raw materials.

Again as shown in Tables 1-13, the mixture of alpha gypsum (26), melamine formaldehyde (27), and ammonium chloride (28) can be utilized as build material (14) and an amount of the acrylic co-polymer (29) or acrylic co-polymer and water (up to 50% depending on the application) can be utilized as the binder liquid (16) in the additive build up process (1). A suitable acrylic copolymer (29) which can be utilized in embodiments of the binder liquid (16) can be Forton VF-812 available from Ball Consulting Ltd., Suite 201, 338 14$^{1h}$ Street, Ambridge, Pa. 15003. The ammonium chloride (28) in the build material (14) facilitates the crosslinking between the melamine formaldehyde resin (27) and the acrylic copolymer (29). Again, while the binder liquid (16) of Table 3 specifically includes Forton VF-812 this is not intended to be limiting with regard to the numerous and varied acrylic copolymers (29) available having similar material characteristics, but rather is intended to provide an example of a melamine formaldehyde resin from which the numerous and wide variety of mold compositions whether explicitly or inherently described can be made and used.

Inventive embodiments of the build up process (1) can utilize the binder liquid (16) in the form of an amount of acrylic co-polymer (29) by weight which does not exceed about 35% in the built up layers which makes thermal expansion sufficiently reduced and consistent to avoid warping of the objects (2)(3)(5)(6) produced from the inventive compositions, including the range of temperature and pressure at which molds (17) and molded parts (19) are produced.

Now referring particularly to Tables 4-7, certain embodiments of the inventive build up material (14) can further include an amount of reinforcement elements (30) of between about 0.5% to about 15% by weight. The reinforcement elements (30) can also take the form of glass microspheres, glass balloons, carbon nanotubes, glass fibers, plastic fibers, or the like. An example of a reinforcement element (30) suitable for use in the build material (14) can be an amount of Cem-Fil Anti-Crak HP available from Saint-gobain Vetrotex America, Inc., 122 West John, Suite 535, Irving, Tex. 75039 can be admixed to various combinations of the build material (14). While Table 5 specifically includes an amount of Cem-Fil Anti-Crak HP this is not this is not intended to be limiting with regard to the numerous and varied reinforcement elements as glass or plastic fibers or spheres available, but rather is intended to provide an example of a reinforcement element from which the numerous and wide variety of mold compositions whether explicitly or inherently described can be made and used.

Now referring particularly to Tables 6-7 and 12-13, an amount of aluminum powder (31) of between about 0.5% to about 20% by weight (or steel powder or stainless steel powder or other metal powders) available from Composites One, 4026 South West Temple, Salt Lake City, Utah 84107 can be admixed to various combinations of the build material (14).

Now referring particularly to Tables 8-11, an amount of carbon black (33) of between about 0.1% to about 10% can be included in certain embodiments of the build material (14). A carbon black (33) suitable for use in producing the inventive mold compositions is Raven 1020 Beads available from Columbian Chemicals Company, 1800 West Oak Commons Court, Marietta, Ga.

Now referring particularly to Tables 10-13, an amount of chop carbon fiber (32) of between about 0.1% and about 15% (wt./wt.) can be included in certain embodiments of the build material (14). A chop carbon fiber (32) suitable for use in producing the inventive build material (14) can be prepared from polyacrylonitrile (PAN) pitch carbon fiber such as product T-700 obtained from Composites One, 4026 South West Temple, Salt Lake City, Utah 84107. The PAN pitch carbon fiber (T-700 or similar material) is then cut, chopped, or otherwise configured as pieces sufficiently small to be used in the additive build up process (1).

Similarly, a variety of materials can be further added to the base mixtures of the build material (14) (such as the mixtures of raw materials or formulations set out in Tables 1-13) to further include the numerous and varied glass micro-balloons (hollow glass spheres) available from Ashland Chemical Company, 5200 Blazer Parkway, Dublin, Ohio 43017 various types of fiberglass chop, ceramic powder, ceramic chop, or the like, available for example from Composites One, 4026 South West Temple, Salt Lake City, Utah 84107.

Now referring primarily to Tables 14 and 15, alpha gypsum (26), melamine formaldehyde resin (27), polyacrylic acid (47), and ammonium chloride (28)(CAS No.: 9003-01-04) can be admixed to obtain a homogeneous mixture of the raw materials. Polyacrylic acid (47) which can be utilized in embodiments of the build material (14) can be obtained as polymers of different molecular weights depending on the application. Embodiments can include a polyacrylic acid (47) having a molecular weights mixtures of molecular weights in a range of about 1800 MW to about 5000 MW or combinations thereof. However, other embodiments can utilize a polyacrylic acid having molecular weights in the range of about 130,000 MW to about 4,000,000 MW which can be used discretely or in various combinations depending upon the application and can be obtained from Sigma-Aldrich, Saint Louis, Mo. (PN 11293, 181285, 30215, 306223). To this admixture one or more of the reinforcement elements (30), aluminum powder (31), carbon black (33), and chop carbon fiber (32) can be admixed in the weight percentages above described for the build materials (14) of Tables 1-13.

With respect to the particular build material (14) shown in Table 14 (and as an alternative binder liquid (16) which can be utilized with the build materials (14) shown in Tables 1-13) a mixture comprising or consisting of isopropyl alcohol (49) (CAS No.: 67-63-0) and water (48) such as deionized water (CAS No.: 7732-18-5) can be utilized in the additive build up process (1). The amount of isopropyl alcohol (49) can comprise or consist of between about 5% and 20% v/v in water (48). As to particular embodiments, the amount of isopropyl alcohol (49) can comprise or consist of between about 10% and 15% v/v with water (48) and can as to particular embodiments comprise or consist of about 10% v/v. As above described the binder liquid (16) can be applied in the build process in sufficient amount to bind the layers of the build up material (14). The amount of binder liquid (16) in relation to the amount of build material (14) can be less than 35% wt./wt.

The build materials (14) and the binder liquid (16) set out by Tables 1-15 are intended to provide a person of ordinary skill in the art sufficient information to make a wide range of build materials (14) and binder liquids (16) utilizing the raw materials listed in the Tables, or equivalents (such as the same raw material under a different name or designated by a different nomenclature or available through a different source) or substantial equivalents of the raw materials (where the raw material may not be identical but is substantially identical in chemical or physical characteristic, or the raw material is identical or substantially identical but further includes a material which does not materially alter the function of the raw material for use in the build material (14) but may require alternation of the percent by weight to achieve the same mold composition characteristics achieved with the identical raw material) mixed in various proportions within the ranges forth in the Tables.

For example, the amount of FGR 95 (or equivalent or substantial equivalent) included in particular embodiment(s) of the inventive build material (14) can be in the range of about 60% to about 75% by weight, with greater or lesser weight percent utilized within the range depending on the particular object (2)(3)(5)(6) characteristics desired for a particular application (for example to reduce or make consistent a particular amount of thermal expansion or contraction). Understandably, without undue experimentation a wide and numerous variety of build material (14) encompassed by the invention can be made and utilized in the production of objects such as molds (3)(17) by the method above-described. One particular advantage of the wide range of inventive build materials (14) can be that the coefficient of expansion of the mold (3)(17) can be adjusted to match the coefficient of expansion of the molded material. While specific suppliers of the raw materials set out above are described, it is not intended that the raw materials must be obtained from these suppliers and the raw materials or the equivalent raw material or the substantially equivalent raw material may be available from numerous and varied sources.

Again referring to FIG. 1, a three dimensional object (2)(3) produced using the inventive build material (shown in the example of FIG. 1 as build material B (14)) and the inventive liquid binder (shown in the example of FIG. 1 as the binder liquid D (16)) can be a dimensionally stable object (shown in the example of FIG. 1 as objects B+D (2) or mold B+D (3)) or an object (2)(3) having a particular pre-selected dimensional stability based on the particular formulation of build material B (14) and the particular formulation of binder liquid D (16).

Figure 2:
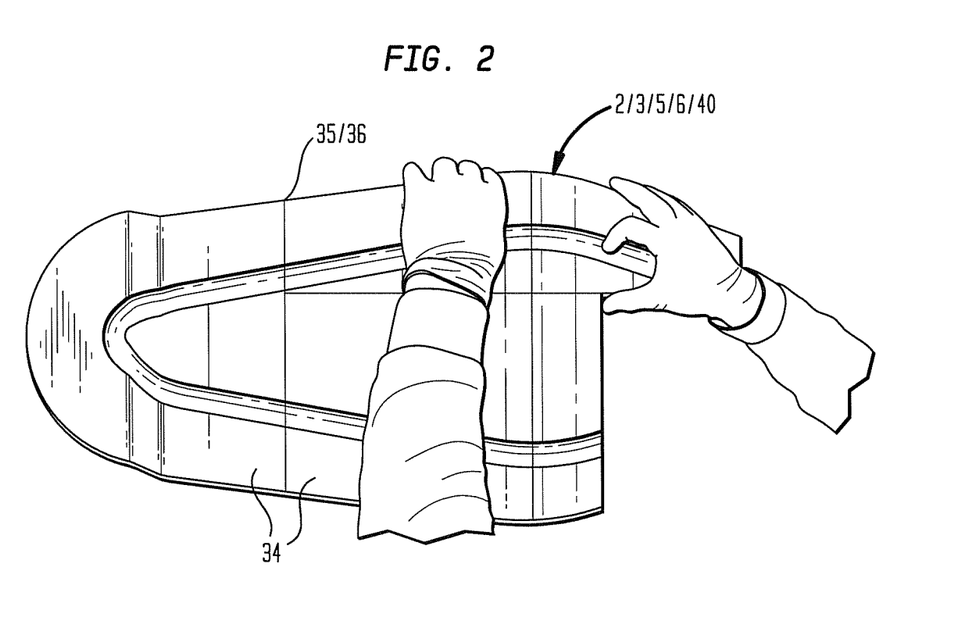
FIG. 2 is an illustration which shows a step of joining a plurality of pieces each generated by a particular embodiment of the additive build up process using a materials printer in production of a dimensionally stable object.
Figure 8:
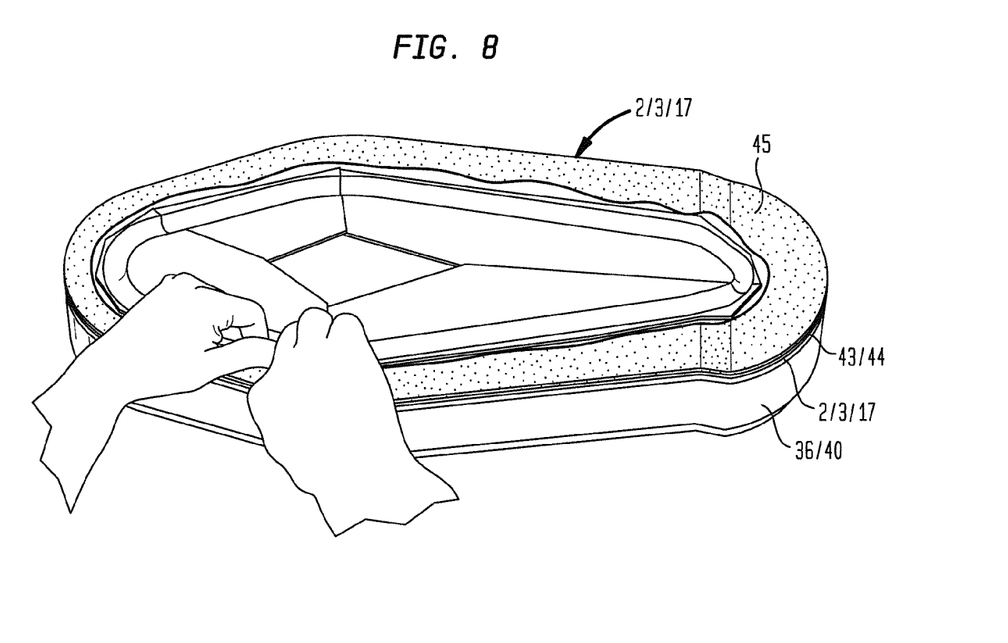
FIG. 8 is an illustration of a dimensionally stable object in the form of a mold produced using an additive build process using materials printer useful, the mold useful in the production molded or formed parts.
Figure 9:
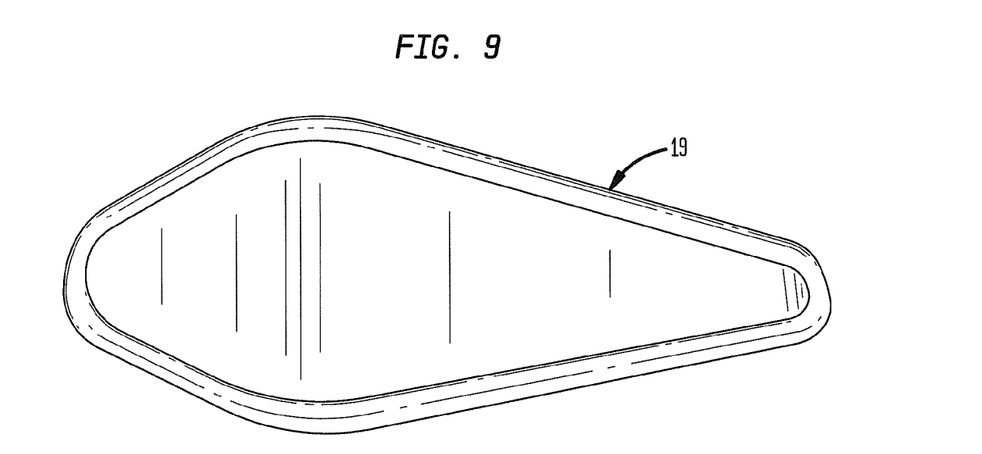
FIG. 9 is an illustration which provides an example of a molded part produced using the particular embodiment of the mold shown in FIG. 8.

Now referring primarily to FIG. 8, one of the dimensionally stable objects (2)(3) which can be produced by the additive build up process (1) using a three dimensional materials deposition apparatus (22) or materials printer (12) with the inventive build material B(14) and the inventive binder liquid D (16) can be a dimensionally stable mold (3) for the production of molded parts (19); however, the invention is not limited to the example of dimensionally stable molds (3), and dimensionally stable objects (2) of nearly any configuration can be produced by the additive build up process (1) using a three dimensional materials deposition apparatus (22) or materials printer (12) and the inventive build material B(14) and the inventive binder liquid D (16). Even though the example of FIG. 8 shows a mold (3)(17) in which a molded part (19) for a snow shoe (as shown in the example of FIG. 9) can be laid up, nearly any configuration of dimensionally stable mold (3) can be made by programming the computer (21) with the digital model (11) and running the application program (24) to control the additive build up process (1). Certain configurations of dimensionally stable objects (2)(3) including, but not limited to, dimensionally stable molds (3), can be made as a plurality of object parts (34) (or mold parts)(as shown in the example of FIG. 2). The plurality of object parts (34) (or mold parts) can be joined by applying an amount of build material B (14) admixed with an amount of binder liquid D (16)(collectively build up material (36)) between joined surfaces of the plurality of object parts (34). The production of dimensionally stable objects (2)(3), and particularly by joining a plurality of object parts (34), confers all of the substantial advantages above described.

In particular, the inventive method of producing dimensionally stable molds (3) using build material B (14) and binder liquid D (16) can substantially reduce or eliminate the steps of machining or otherwise fabricating a dimensionally stable mold (3), in fact, as to certain configurations of dimensionally stable molds (3) produced using build material B (14) and binder liquid D (16) the additive build up process (1) using a three dimensional materials deposition apparatus (22) or materials printer (12), as above described can yield a dimensionally stable mold (3) which can be directly utilized without further machining, curing, coating, or sealing for the production of molded parts (19) or with a limited post-production treatment (4) to seal the surface. If made by joining a plurality of object parts (34)(mold parts), the one or more joints (35) may require removal of any excess build up material (36) to produce a sufficient smooth one more joints (35).

Figure 4:
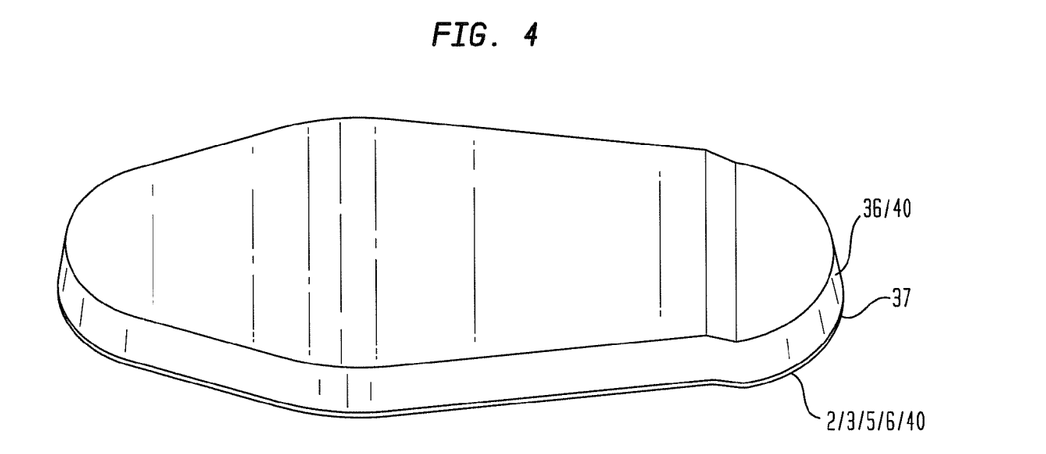
FIG. 4 is an illustration of a step of applying a dimensionally stable build composition to a portion of the surface of an object made by an additive build up process using a materials printer.
Figure 5:
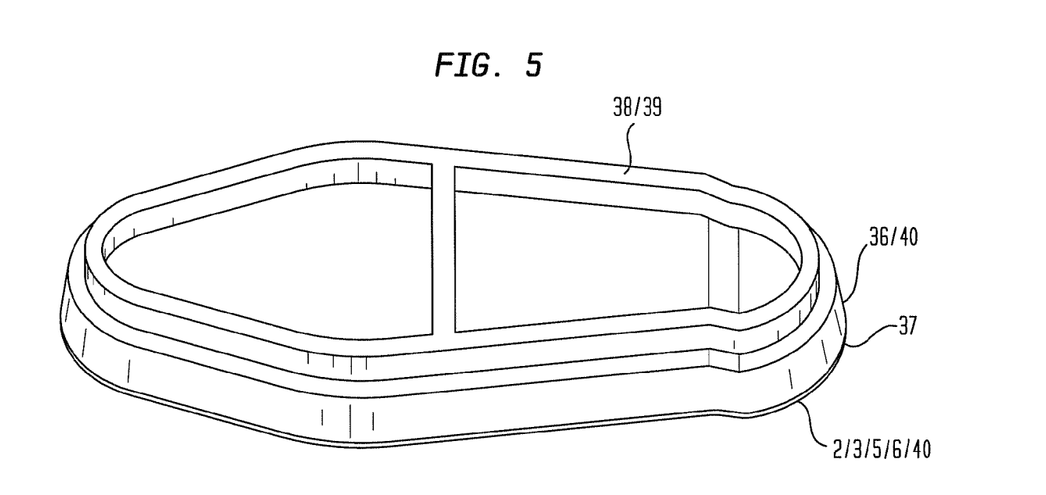
FIG. 5 is an illustration of a step of joining support member to a portion of the surface of an object made by an additive build up process using a materials printer.

Now referring primarily to FIGS. 4 and 5, if necessary, the thickness of the dimensionally stable mold (3) can be increased by applying an amount of build up material (36) prepared by admixing an amount of build material B (14) with an amount of binder liquid D (16) to a surface portion (37) of the mold (3) (as shown in the example of FIG. 4). The thickness of the mold (3) may be increased for example to increase strength of the mold (3) or to provide a base for the purpose of positioning the mold (3) in a particular orientation, or otherwise. Certain embodiments of the dimensionally stable mold (3) may further include reinforcement members (38), such as a tubular metal framework (39) (as shown in the example of FIG. 5) coupled to a surface portion (37).

Figure 3:
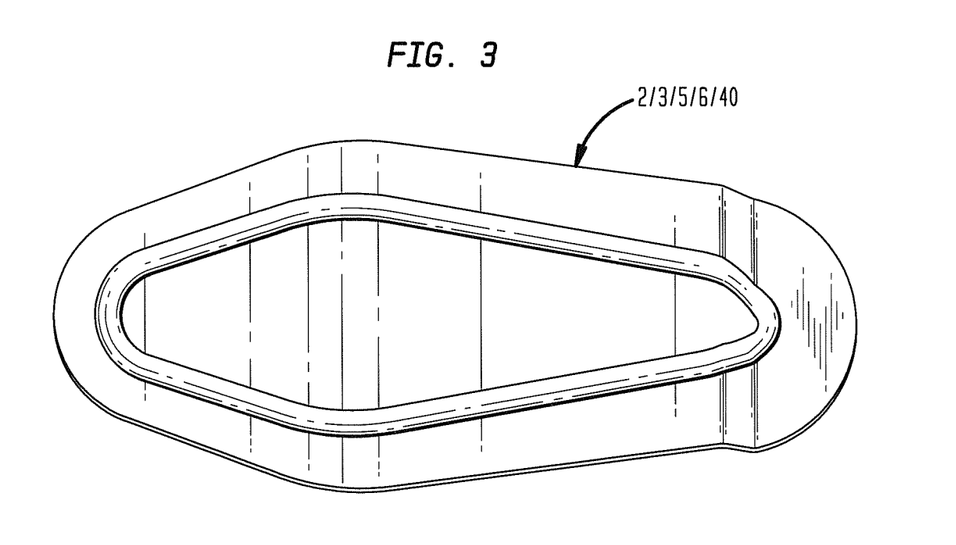
FIG. 3 is an illustration of a step in producing a dimensionally stable object in which a plurality of pieces each generated by an additive build up process using a materials printer have been joined to provide a one-piece dimensionally stable object.

Again referring to FIG. 1, particular embodiments of the invention include a mold core (40)(shown in the example of FIG. 1 as mold A+C (5)) produced by the use of a conventional build material (13) (shown in the example of FIG. 1 as build material A) and a conventional liquid binder (15) (shown in the example of FIG. 1 as binder liquid C) used in accordance with the instructions provided by the manufacturer of the particular three dimensional materials deposition apparatus (22). The mold core (40) can be produced by the additive build up process (1) performed by a three dimensional materials deposition apparatus (22), such as a 3-D printer. Particular configurations of the mold core (40) can be made as a plurality of object pieces (34)(as shown in the example of FIG. 2) and joined as above described to produce the mold core (40)(as shown in the example of FIG. 3).

In a subsequent step, an amount of build up material (36) prepared by admixing an amount of build material B (14) with an amount of binder liquid D (16) can be applied to a first surface portion (37) of the mold core (40) (as shown in the example of FIG. 4) which does not interfere with molding the molded part (19). The thickness of the mold core (40) may be increased for example to increase strength of the mold core (40), or to make the mold core (40) dimensionally stable as to the treated surface portion (37), or to provide a base (41) for the purpose of positioning the mold core (40) in a particular orientation, or otherwise. As to certain embodiments, reinforcement members (38), such as a tubular metal framework (39) (as shown in the example of FIG. 5) can be coupled to a surface portion (37) to further augment the strength, stability or placement of the mold core (40).

Figure 6:
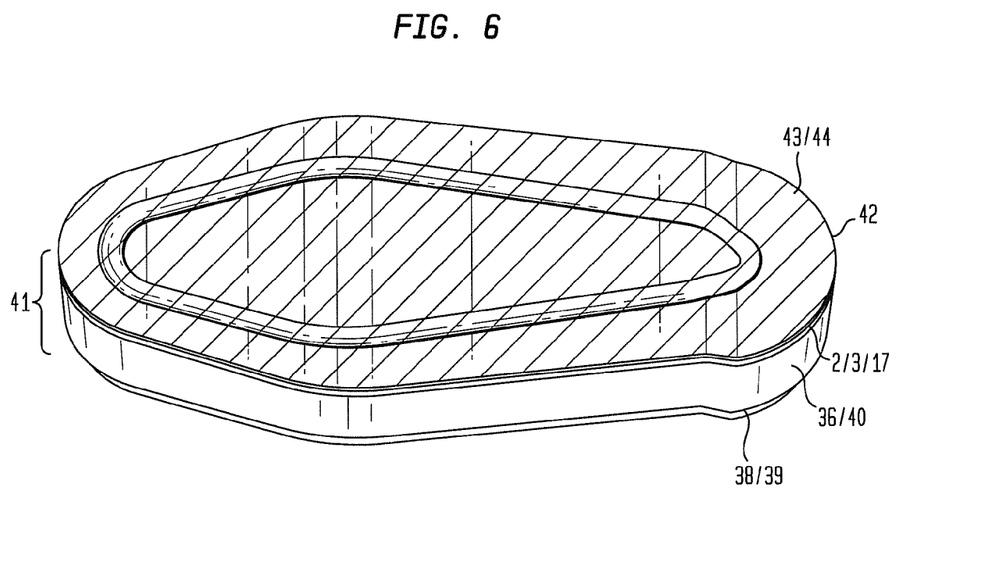
FIG. 6 is an illustration of a step of applying a thermosetting polymer to a portion of the surface of an object made by an additive build up process using a materials printer.

In a subsequent step, an amount of thermoset resin (44) can be applied to a second surface portion (42) in which the molded part (19) will be laid up, formed in or molded. The term "thermoset resin" as used for the purposes of this invention is a thermosetting polymer having a state sufficiently fluid to be applied by spray, brush, or similar application method to provide an applied resin layer that changes irreversibly into an infusible, insoluble thermoset layer (43) by curing (as shown in the example of FIG. 6—the thermoset layer (43) in designated by diagonal lines). As one example, an amount of epoxy resin can be applied to the second surface portion (42). The epoxy resin cures to provide the thermoset layer (43). One or more applications of the thermoset resin (44) can sufficiently build up the second surface portion (42) of the mold core (40) to provide a mold core (40) sufficiently dimensionally stable for use as a mold (17) for the production of molded parts (19).

Figure 7:
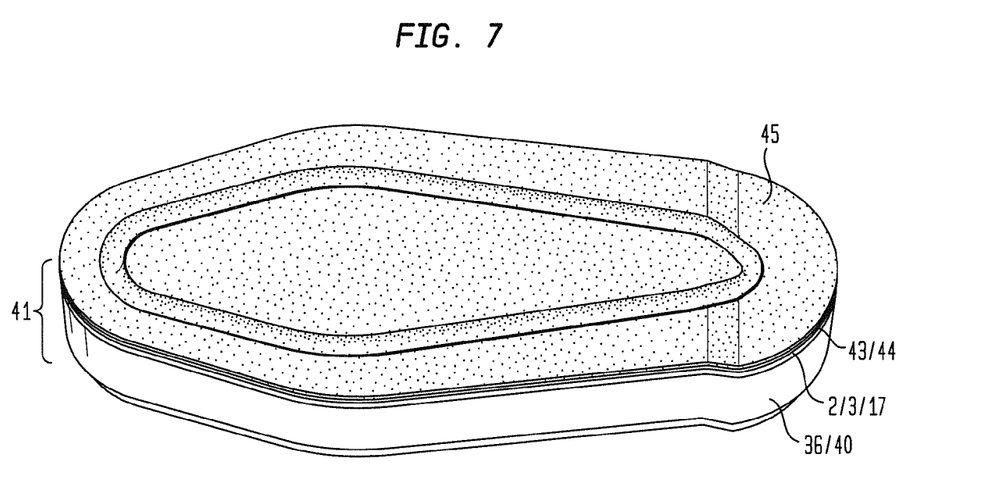
FIG. 7 is an illustration of a step of applying a sealer to a portion of the surface of an object made by an additive build up process using a materials printer.

In a subsequent step, an amount of sealer (45) can be applied to the second surface portion (42) over the thermoset layer (43) to seal the thermoset layer (43). A sealer (45) suitable for use with embodiments of the invention can be as examples Duratec Grey VE Primer, Chemtrend, Chemlease MPP2180.

Again referring to FIG. 1, particular embodiments of the invention include a mold core (6)(shown in the example of FIG. 1 as mold B+C (6)) produced by the use of build material B (14) and a conventional liquid binder C (15). The mold core (6) can be produced by the additive build up process (1) performed by a three dimensional materials deposition apparatus (22), such as a 3-D printer. Particular configurations of the mold core (6) can be made as a plurality of object pieces (34)(as shown in the example of FIG. 2) and joined as above described to produce the mold core (6)(as shown in the example of FIG. 3).

In a subsequent step, an amount of build up material (36) prepared by admixing an amount of build material B (14) with an amount of binder liquid D (16) can be applied to a first surface portion (37) of the mold core (6) (as shown in the example of FIG. 4) which does not interfere with molding the molded part (19). The thickness of the mold core (6) may be increased for example to increase strength of the mold core (6), or to make the mold core (6) dimensionally stable as to the treated surface portion (7), or to provide a base (46) for the purpose of positioning the mold core (6) in a particular orientation, or otherwise. As to certain embodiments, reinforcement members (38), such as a tubular metal framework (39) (as shown in the example of FIG. 5) can be coupled to a surface portion (39) to further augment the strength, stability or placement of the mold core (6).

As to these embodiments of the invention, the step of applying an amount of thermoset resin (44) to a second surface portion (42) in which the molded part (19) will be laid up, formed in or molded can be omitted. In a subsequent step, an amount of sealer (45) can be applied to the second surface portion (42) of the mold core (6). Embodiments of the mold (17) produced by this process can be utilized to produce molded products (19).

Now referring to FIG. 8, which shows the lay up (46) of a molded part (19) in a mold (17) produced by the additive build up process (1), as above described. While the mold (17) shown in FIG. 8 is utilized in the production of a molded part (19) by laminating two or more layers of material with an adherent under heat and pressure as described for example in U.S. patent application Ser. No. 13/353,185, hereby incorporated by reference herein, molds (17) made by the above described additive build up process (1) can be used in a numerous and wide variety of applications to form molded parts (19) and as one further example, can be used in the form of mated press molds.

Now referring primarily to FIG. 9, which provides an example of a molded part (19) in the form of a snow shoe; the invention is not so limited, and molds (17) or mold cores (40) made by the above described additive build up process (1) can be utilized to produce a numerous and wide variety of molded parts (19) such as armor plates, helmets, body armor, shields, sporting equipment, automotive panels, or the like made by the laminating process described in U.S. patent application Ser. No. 13/353,185, or other laminating process, or compression molded products in which preheated molding material, is first placed in an open, heated mold cavity. The mold (17) can be closed with a top force or plug member, pressure is applied to force the molding material into contact with all mold areas, while heat and pressure are maintained until the molding material has cured. The process can employ thermosetting resins in a partially cured stage, either in the form of granules, putty-like masses, or preforms. Compression molding can be suitable for molding complex, high-strength fiberglass reinforcements. Advanced composite thermoplastics can also be compression molded with unidirectional tapes, woven fabrics, randomly oriented fiber mat or chopped strand and can produce large, intricate parts. Materials that are typically manufactured through compression molding include: Polyester fiberglass resin systems (SMC/BMC), Torlon, Vespel, Poly(p-phenylene sulfide) (PPS), and many grades of PEEK.

As can be easily understood from the foregoing, the basic concepts of the present invention may be embodied in a variety of ways. The invention involves numerous and varied embodiments of an inventive additive process for the production of stable three dimensional objects including stable three dimensional molds, compositions for use in and methods for using such molds including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "printer" should be understood to encompass disclosure of the act of "printing"—whether explicitly discussed or not—and, conversely, were there effectively disclosure of the act of "printing", such a disclosure should be understood to encompass disclosure of a "printer" and even a "means for printer." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the hangers herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. A build material for a three dimensional printer, comprising:
    an amount of alpha gypsum of between about 65% and about 95% (wt./wt.);
    an amount of melamine formaldehyde resin of between about 5% and about 10% (wt./wt.);
    an amount of ammonium chloride of between about 0.1% and about 1.0% (wt./wt.); and
    an amount of polyacrylic acid of between about 2% and about 5% (wt./wt.).

2. The build material of claim 1, further comprising an amount of reinforcement elements of between about 0.5% and about 5% (wt./wt.).

3. The build material of claim 1, wherein said amount of reinforcement elements comprise one or more of said reinforcement elements selected from the group consisting of: glass balloons, glass microspheres, carbon nanotubes, glass fibers, and plastic fibers, clay nanotubes, or combinations thereof.

4. The build material of claim 1, further comprising an amount of aluminum powder of between about 0.5% and about 5% (wt./wt.).

5. The build material of claim 1, further comprising an amount of carbon black of between about 0.1% and about 5% (wt./wt.).

6. The build material of claim 1, further comprising an amount of chop carbon fiber of between about 0.5% and about 5% (wt./wt.).

7. The build material of claim 1, further comprising an amount of microballoons of between about 0.5% to about 2% (wt./wt.).

8. A composition for a three dimensional printer, comprising:
    a build material, including:
        an amount of alpha gypsum of between about 50% and about 75% (wt./wt.);
        an amount of melamine formaldehyde resin of between about 5% and about 7% (wt./wt.); and
        an amount of ammonium chloride of between about 0.1% and about 1.0% (wt./wt.);
        an amount of polyacrylic acid of between about 2% and about 5% (wt./wt.): and
    a binder liquid.

9. The composition of claim 8, wherein said build material further comprises an amount of reinforcement elements of between about 0.5% and about 5% (wt./wt.).

10. The composition of claim 8, wherein said amount of reinforcement elements comprise one or more of said reinforcement elements selected from the group consisting of: glass balloons, glass microspheres, carbon nanotubes, glass fibers, and plastic fibers, or combinations thereof.

11. The composition of claim 8, wherein said build material further comprises an amount of aluminum powder of between about 0.5% and about 5% (wt./wt.).

12. The composition of claim 8, wherein said build material further comprises an amount of carbon black of between about 0.1% and about 5% (wt./wt.).

13. The composition of claim 8, wherein said build material further comprises an amount of chop carbon fiber of between about 0.5% and about 5% (wt./wt.).

14. The composition of claim 8, wherein said build material further comprises an amount of microballoons of between about 0.5% to about 2% (wt./wt.).

15. The composition of claim 8, wherein said binder liquid comprises an amount of acrylic co-polymer.

16. The composition of claim 8, wherein said binder liquid comprises:
    an amount of water; and
    an amount of isopropyl alcohol.

17. The binder liquid of claim 16, wherein said amount of isopropyl alcohol comprises an amount of isopropyl alcohol of between about 5% and about 20% v/v in said amount of water.

18. The binder liquid of claim 17, wherein said amount of isopropyl alcohol comprises an amount of isopropyl alcohol of about 10% v/v.

19. The binder liquid of claim 16, further comprising an amount of the acrylic co-polymer.

20. The binder liquid of claim 17, wherein said amount of acrylic co-polymer of about 30% and about 75% v/v.

* * * * *